United States Patent [19]
Rudi

[11] Patent Number: 4,622,606
[45] Date of Patent: Nov. 11, 1986

[54] MAGNETIC TAPE RECORDER
[75] Inventor: Guttorm Rudi, Fjellhamar, Norway
[73] Assignee: Tandberg Data A/S, Oslo, Norway
[21] Appl. No.: 555,151
[22] Filed: Nov. 25, 1983
[51] Int. Cl.[4] .................... G11B 5/008; G11B 15/00
[52] U.S. Cl. .................................. 360/96.5; 360/105
[58] Field of Search .................. 360/90, 93, 95–96.6, 360/104–105, 109; 242/192, 198–203

[56] References Cited
U.S. PATENT DOCUMENTS

| | | | |
|---|---|---|---|
| 3,976,262 | 8/1976 | Kennedy | 360/96.4 X |
| 4,052,742 | 10/1977 | Pastor | 360/96.1 |
| 4,396,963 | 8/1983 | Wright | 360/97 |
| 4,559,571 | 12/1985 | Olmsted | 360/105 |
| 4,573,091 | 2/1986 | Barton | 360/93 |

Primary Examiner—A. J. Heinz
Attorney, Agent, or Firm—Hill, Van Santen, Steadman & Simpson

[57] ABSTRACT

The magnetic tape recorder exhibits an insertion channel into which a cassette containing a magnetic tape is inserted in a longitudinal direction. A capstan driven by a tape drive motor and a magnetic head are disposed at one side of the insertion channel. A dust cover for the cassette is hinged out by a pivot arrangement during closing of a cover for the insertion channel. The magnetic head is disposed on a magnetic head carrier that is pivotable around an axis and is coupled with the cover for the insertion channel such that the magnetic head is pivotable into place behind the dust cover in contacting relation to the magnetic tape after said dust cover has been opened. The cassette is locked in a defined working position after the cover for the insertion channel is closed. For removal of the cassette, the magnetic head is pivoted out of its operating position into an idle position as the cover for the insertion channel is opened, whereupon the dust cover is hinged back into its closed position.

20 Claims, 3 Drawing Figures

MAGNETIC TAPE RECORDER

BACKGROUND OF THE INVENTION

The invention relates to a magnetic tape recorder wherein a cassette for the storage of data signals can be placed into operative association with a magnetic head which is capable of data recording and/or playback operation. The magnetic tape contained in the cassette can be moved past the magnetic head with use of a capstan drive energized by a tape drive motor.

Magnetic tape recorders are generally known wherein data are recorded on a magnetic tape contained in a cassette and are read therefrom. A cassette containing a capstan idler and a pivotably disposed dust cover in addition to the reels for the magnetic tape is employed when recording digital data. The cassette is usually pushed into an insertion channel of the magnetic tape recorder in a transverse direction toward the magnetic head. The dust cover is thereby automatically opened. A tape capstan driven by a tape drive motor, and the magnetic head are disposed at the back side of the insertion channel. The tape capstan presses the magnetic tape against the capstan idler in order to drive said tape. The magnetic head contacts the magnetic tape at the working area released by the dust cover in order to record or read the data. Such magnetic tape recorders exhibit a relatively large width that is essentially determined by the length of the cassette.

SUMMARY OF THE INVENTION

The object of the invention is to specify a magnetic tape recorder that is provided for digital recording of data and that exhibits particularly small dimensions.

Given the magnetic tape recorder of the type initially defined, this object is inventively achieved by means of the features recited in Patent Claim 1.

The inventive magnetic tape recorder has the advantage that it exhibits small external dimensions despite the employment of relatively large cassettes so that a high memory capacity is achieved with a relatively small magnetic tape recorder. The magnetic tape recorder can use the cassettes even though these were originally intended for employment in magnetic tape recorders wherein the cassette is inserted in a transverse direction.

A relatively simple structure of the magnetic tape recorder is achieved when the actuation of a pivot arrangement and the pivoting of the magnetic head to a position behind the dust cover ensues during insertion of the cassette into its final operating position. It is particularly favorable for the insertion of the cassette into the final operating position when this ensues while a cover covering the insertion channel is being closed.

An advantageous design of the pivot arrangement is achieved when this is formed by a rotatably mounted swivel arm and a connecting rod disposed at the inside of the insertion channel cover and when the free end of the swivel arm presses against a lever-like extension of the dust cover while the insertion channel cover is being closed.

The pivot of the magnetic head is achieved in that the magnetic head carrier is mounted for pivotal movement about an axis and is pivotable into its idle position when the insertion channel cover is opened, by means of a head retraction mechanism secured to the inside of the cover and is pivotable into its operating position when the cover is closed by means of a spring secured to the magnetic head carrier. The head retraction mechanism is expediently designed as a tension spring. The spring pivoting the magnetic head into its operating position is expediently designed as a compression spring disposed concentric to the axis of the magnetic head carrier which exerts a torsional force on the magnetic head carrier. The magnetic head carrier can be designed such that it shifts the magnetic head along the axis by means of a drive motor in order to position the magnetic head at various tracks of the magnetic tape.

In order to be able to remove the cassette from the magnetic tape recorder after the cover has been opened, it is advantageous to provide a leaf spring at the back end of the insertion channel, said leaf spring pushing the cassette out when the cover is opened.

It is favorable for adjusting the cassette in a reference position to provide pins representing reference points for a plane of reference of the magnetic tape at the back end of the insertion channel and at the inside of the cover.

It is advantageous for locking the cassette in its final position when balls disposed on leaf springs are provided at the beginning and at the end of the insertion channel, said balls pressing from below against recesses in the cassette, and when a wedge is provided at the cover, said wedge pressing the leaf spring at the entrance of the insertion channel in the direction toward the cassette when the cover is closed.

Since the capstan idler is disposed recessed in the cassette, it is expedient to pivotably mount the tape drive motor together with the capstan so that the capstan rolls along the longitudinal side of the cassette as the cassette is being inserted and removed.

An exemplary embodiment of the inventive magnetic tape recorder is explained in greater detail below with reference to the accompanying drawing sheets; and other objects, features and advantages will be apparent from this detailed disclosure and from the appended claims.

DETAILED DESCRIPTION

Figure 1:
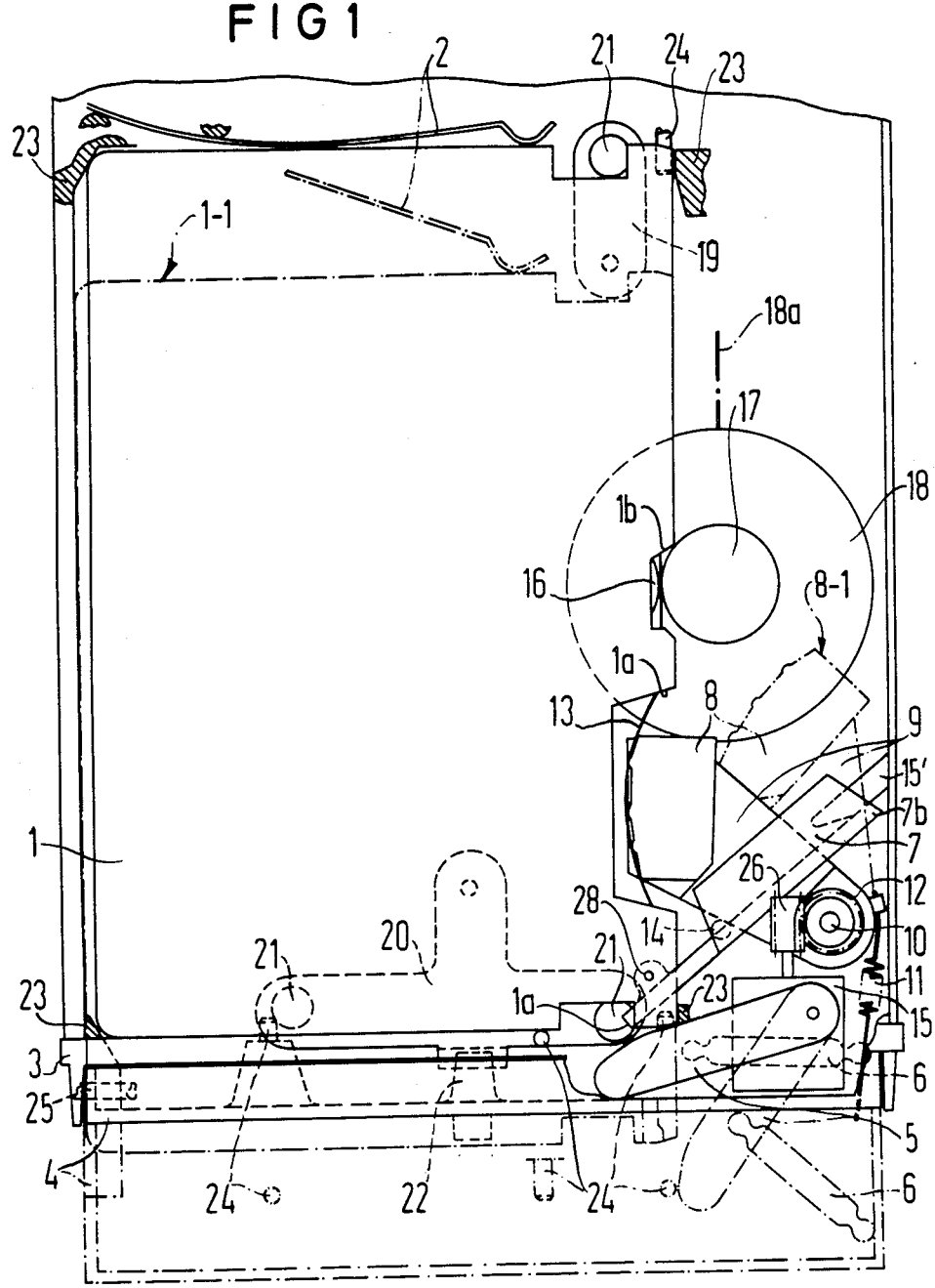
FIG. 1 is a partial plan view of the magnetic tape recorder.

The magnetic tape recorder or transducer system illustrated in FIG. 1 has a longitudinal insertion channel for receiving a cassette 1. The cassette is illustrated with dot-dash lines in its partially inserted position and with solid lines in its final operating position. The cassette 1 is inserted into the channel lateral end first in a longitudinal direction and is held in this position against the action of a leaf spring 2 at the back end of the insertion channel. The housing 3 of the magnetic tape transducer unit is provided with a hinged cover 4 which is shown with dot-dash lines in its opened position and with solid lines in its closed position. The magnetic tape recorder contains a pivot arrangement comprised of a swivel arm 5 and a connecting rod 6, said pivot arrangement serving for the automatic opening of a dust cover 7 at a scanning location at a front end of the cassette 1. The swivel arm 5 is mounted for pivotal movement about an axis. One end of the connecting rod 6 is coupled with the swivel arm 5 while its other end is coupled to the inside of the cover 4. A magnetic head 8 is secured to a magnetic head carrier 9 which is pivotable around the axis of a shaft 10. With an open cover 4, the magnetic head 8 is situated in the position shown with dot-dash lines as the result of the operation of a retraction mechanism 11 designed, for example, as a tension spring, that is secured to the inside of the cover 4 and to the magnetic head carrier 9. The pivot arrangement 5,6 is situated in the position shown with dot-dash lines when the cover is in open position.

When the cover 4 is closed, the free end of the swivel arm 5 presses against a back projection or extension 7a of the dust cover 7 and pivots said cover 7 out of a recess 1a of the cassette 1. The head retraction mechanism 11 is also relieved in the closed position of the cover so that a prestressed compression spring 12 disposed concentrically to the axis of shaft 10 can exert a torsional force on the magnetic head carrier 9, and the magnetic head 8 is pivoted behind the dust cover 7 into its operative location where it contacts the magnetic tape 13 (as shown with solid lines in FIG. 1). The magnetic head carrier 9 is pivoted by spring 12 so that the carrier 9 engages a detent 14 and is held in this position. The magnetic head 8 is displaceable in the direction of the axis of the shaft 10 and, thus, perpendicular to the running direction of the magnetic tape 13 upon employment of a drive motor 15 in order to be able to position the magnetic head 8 in scanning relation to various tracks of the magnetic tape 13. The dust cover 7 is held in its open position by a detent 15'. Said detent 15' can also serve as a detent for the magnetic head carrier 9 in its idle position.

A capstan idler 16 is disposed at a recess 1b in the cassette 1. The capstan 17 and the tape drive motor 18 are therefore pivotably designed with a resilient bias toward the cassette so that the capstan 17 rolls along the long side of the cassette 1 as the cassette 1 is inserted or removed. The tape drive motor 18 is expediently mounted at its center of gravity for pivotal movement about an axis 18a and the capstan 17 is biased against the cassette 1.

Leaf springs 19 and 20 provided with balls 21 press against the cassette 1 from below. The leaf spring 19 presses against the cassette 1 with a prescribed pressure whereas the leaf spring 20 presses against the cassette 1 with reduced force. When the cover 4 is completely closed, a wedge 22 presses against the leaf spring 20 so that this presses toward the cassette 1 with the same force as the leaf spring 19. The balls 21 engage in corresponding recesses of the cassette 1. Cooperating surfaces 23 are provided on the transducer unit at the locations of the insertion channel allocated to the four corners of the cassette 1 for the purpose of locking the cassette in the final position. Reference pins 24 are also provided for defining a plane of reference of the magnetic tape 13. One of said reference pins 24 is disposed at the back end of the insertion channel, whereas three reference pins 24 are disposed at the inside of the cover 4. The cover 4 is held in its closed position by means of pins 25 at both sides of the cover 4, said pins 25 being provided with springs.

When the cover 4 is opened, the magnetic head 8 is pivoted back into its idle position under the influence of the retraction mechanism 11. Moreover, the pivot arrangement 5,6 again assumes the position indicated with dot-dash lines. The leaf spring 2 pushes the cassette 1 back to the position illustrated with dot-dash lines so that said cassette 1 can be manually removed from the magnetic tape transducer unit.

Figure 2:
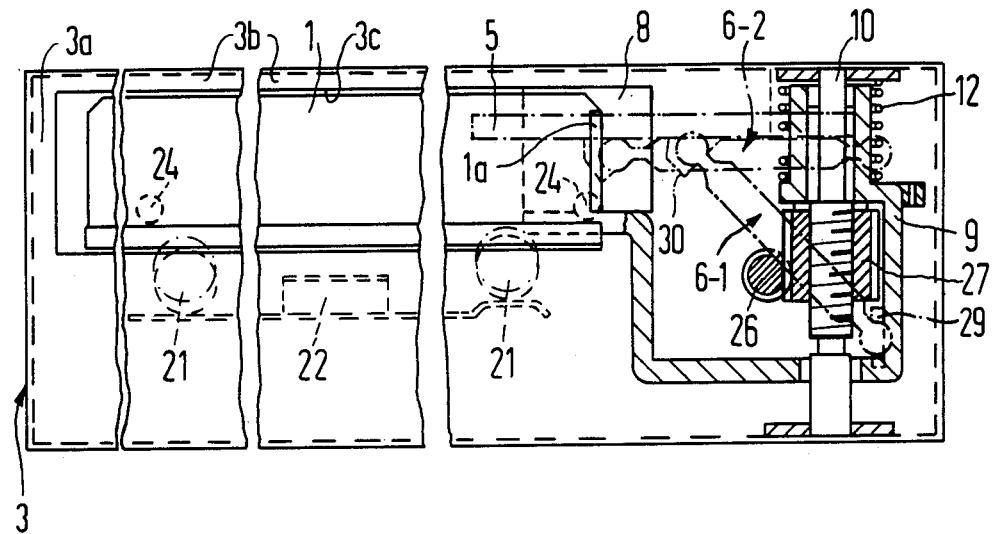
FIG. 2 is a fragmentary transverse sectional view of the magnetic tape recorder.

In the cross-section through the magnetic tape recorder illustrated in FIG. 2—this being broken at the number of places for reasons of space—the cassette 1 is shown inserted in the insertion channel. The steel balls 21 have been pressed into the corresponding recesses of the cassette under the influence of the leaf spring 22. The magnetic head 8 on the magnetic head carrier 9 is situated in its operating position. The magnetic head carrier is pivotable around the axis of the fixedly-mounted shaft 10. The magnetic head carrier 9 is also displaceable along the axis of the shaft 10 in order to be able to position the magnetic head in scanning relation to various tracks of the magnetic tape 13. The displacement of the magnetic head carrier 9 ensues upon employment of a worm 26 driven by the drive motor 15, said worm 26 in turn driving a worm wheel 27. The worm wheel 27 has an interior thread that interacts with an external thread on the fixed shaft 10. Given a rotation of the worm wheel 27, the worm wheel 27 is displaced longitudinally of the fixed shaft 10, and in a direction which is a function of the rotational sense of the worm 26. The compression spring 12 prevents a simultaneous rotation of the magnetic head carrier 9 and also presses the magnetic head carrier 9 against the worm wheel 27. The magnetic head carrier 9 thus follows the longitudinal motion of the worm wheel 27 along the shaft 10 so that the magnetic head 8 can be positioned to various tracks of the magnetic tape 13 in this matter.

Figure 3:
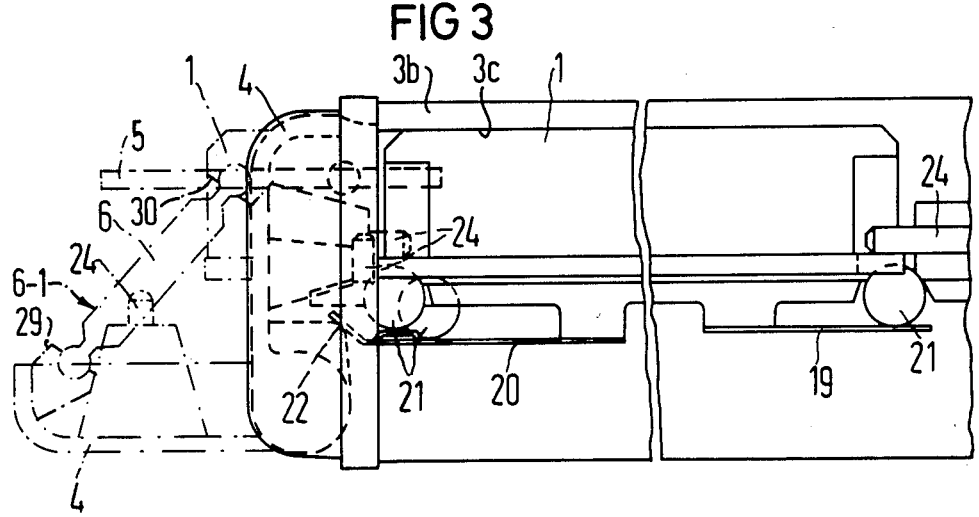
FIG. 3 is a partial fragmentary longitudinal sectional view of the magnetic tape recorder.

In the longitudinal section through the magnetic tape recorder shown in FIG. 3—likewise multiply broken for reasons of space—the cassette 1 is shown situated in its operating position with solid lines and is locked by the steel balls 21 and by the pins 24. The wedge 22 presses against the leaf spring 20. In the illustration with dot-dash lines, the cassette 1 is situated in the interim position with an opened cover 4. In this case, the pivot arrangement 5,6 is pivoted out and does not contact the cassette 1.

It will be apparent that many modifications and variations may be made without departing from the scope of the teachings and concepts of the present invention.

SUPPLEMENTARY DISCUSSION

An improved magnetic recorder having features in common with the subject matter of the present application is disclosed in German application No. P3317 720.1 filed May 16, 1983, and the disclosure of said German application is incorporated herein by reference, as illustrating a further embodiment within the broad concepts and teachings of the present invention.

In the embodiment of FIGS. 1 and 2 herein, and in the embodiment of said German application the cassette is loaded longitudinally into a tunnel-like channel. A tape path between the reels of the cassette extends along a long side of the cassette. At this tape path there is a first lateral opening forming a drive location. The cassette is recessed (recess 1b) at this drive location to receive the tape drive capstan. In a fully rewound condition of the tape, a tape leader may close this first lateral opening. A second lateral opening in the cassette is at a transducing location along the tape path, and here the cassette is recessed (at 1a) to accomodate the active position of the magnetic head which is to be transversely indexed so as to be placed in scanning relation to any of a multiplicity of side by side channels on the magnetic tape.

In each embodiment an initial closing movement of a cassette retaining cover or actuator (cover 4) actuates a pivot arrangement coupled with the cover so as to swing the dust cover (dust cover 7) through a dust cover path which is clear of the idle position of the magnetic head. Further closing movement of the retaining cover now results in movement of the cassette further into the insertion channel as well as movement of the magnetic head toward its operative position. In order to provide a desired compactness of the tape transducer unit in the illustrated embodiments, the idle position of the magnetic head may be sufficiently close to the insertion channel so that the dust cover could not move from its closed position to its open position with the cassette fully inserted into the insertion channel. Thus in each illustrated embodiment, a control means is provided which is responsive to closing of the cassette retaining cover to move the dust cover to its open position before the cassette has been fully inserted into the insertion channel. In this way, the magnetic head does not prevent the opening of the dust cover, even though the idle position of the head is close to the insertion channel.

While it is conceivable that the magnetic head could be parked at an extreme position in the axial direction parallel to its pivot axis during loading of the cassette such that the dust cover could swing at a level e.g. above the level of the magnetic head and its carrier, this would require a greater extent of axial travel of the magnetic head than that required merely to scan the different channel on the record tape and thus imply a less compact housing for the transducer unit.

Referring to the embodiment of FIGS. 1 and 2 herein, the dust cover 7 may have its extension arm 7a pivotally mounted as indicated at 28 in FIG. 1 so that the dust cover 7 cannot return to the closed position, even with the head 8 in its idle position (indicated at 8-1 in FIG. 1) until leaf spring 2 shifts the cassette a substantial distance toward its ejected position (shown at 1-1 in FIG. 1). Once the dust cover 7 is disengaged from latch 15' (e.g. as a result of the movement of the cassette to ejected position 1-1 under the impetus of leaf spring 2) a torsion spring at the pivot axis 28 may return the dust cover 7 to its closed position.

In FIG. 2, the connecting rod is indicated at 6-1 in a initial position with cover 4 open, and is indicated at 6-2 in a final position with he cover fully closed. As an example, a retainer is indicated at 29 in FIGS. 2 and 3 for coupling the connecting rod 6 with cover 4, and a retainer 30 is indicated for coupling the connecting rod 6 with the swivel arm 5.

As shown in FIGS. 2 and 3, the housing 3 provides fixed walls at 3a, 3b which define a fixed tunnel-line ensertion channel into which the cassette 1 is inserted edgewise in a horizontal orientation. The connecting rod 6, swivel arm 5 and extension 7a form a control means which engages the dust cover 7 as cover 4 is closed while the cassette is in an initial position such as 1-1, FIG. 1. As the cassette 1 is advanced toward its fully inserted position, an edge 7b on the dust cover may engage with a fixed part of latch 15' so that the dust cover 7 is held clear of head 8 as indicated in FIG. 1 to freely accomodate indexing movement of the head 8. When the cover 4 is opened, the latch 15' retains dust cover 7 in its open position shown in FIG. 1 as the head 8 is retracted to its idle position 8-1, FIG. 1. As leaf spring 2 moves the cassette to position 1-1, FIG. 1, the edge 7b disengages from latch 15' and the dust cover 7 is restored to its closed position e.g. by a torsion spring on pivot pin 28 similar to torsion spring 12 which acts on the head carrier 9.

When the cassette 1 has been removed from housing 3 and the cover 4 returned to its closed position (e.g. by tension spring 11), the frictional force of latch 15' on the head carrier 9 may be sufficient to dampen the return movement of the head 8 under the impetus of torsion spring 12. Additionally, latch 15' may latch the head carrier 9 at the idle position and require a definite (e.g. manual) release before a scanning operation by means of the magnetic head 8 can be set in progress. In any event opening of the cover 4 assures that the head 8 will be in the retracted position 8-1 before a new cassette is inserted into the insertion channel.

The upper wall 3b may provide an interior horizontal surface 3c which slightly above the final position of cassette 1 with cover 4 fully closed.

I claim as my invention:

1. A magnetic tape transducer system, comprising: a tape transducer unit; a cassette having a front end and first and second lateral ends,
a magnetic tape movable along a tape path past a scanning location at the front end of the cassette, and a dust cover which is pivotable between a closed position covering said scanning location and an open position exposing said scanning location; the tape transducer unit having a magnetic head for scanning of said magnetic tape at said scanning location, a tape drive motor, and a capstan driven by said tape drive motor positioned to drive the magnetic tape along the tape path; the tape transducer unit having an insertion channel means for receiving said cassette with the first lateral end leading and wherein the first lateral end is adjacent a back end of the channel means when the cassette is fully inserted; the magnetic head and the capstan being disposed at a side of said insertion channel means adjacent the cassette front end when the cassette is fully inserted, insertion means for inserting the cassette into a final position in the channel means; means for pivoting said dust cover to its open position as the cassette is being inserted by the insertion means, a magnetic head carrier means carrying the magnetic head and pivotably mounted to the transducer unit; and means coupling the head carrier means to the insertion means for swinging the magnetic head from an idle position into scanning relation with the magnetic tape at the scanning location behind the dust cover simultaneously as the dust cover is pivoted from its closed to open positions during insertion of the cassette by the insertion means.

2. A magnetic tape transducer system as claimed in claim 1 wherein the head carrier means pivots about an axis perpendicular to a direction of tape transport of the cassette so that the magnetic head swings in a horizontal plane perpendicular to the axis of the dust cover toward the scanning location.

3. A magnetic tape transducer system as claimed in claim 1 wherein said insertion means comprises a cassette positioning cover means movable for closing the insertion channel means, and effecting the insertion of the cassette into its final operating position and said means for pivoting the dust cover being directly coupled to said cassette positioning cover means.

4. A magnetic tape transducer system as claimed in claim 1, wherein said insertion means comprises a cassette positioning cover means for closing the insertion channel means as the cassette is inserted in its final position therein; the pivoting means comprising a rotatably mounted swivel arm and a connecting rod connected with the swivel arm and coupled with an inside of the cassette positioning cover means; and a free end of the swivel arm being positioned to press against a lever-like extension of the dust cover as the cassette positioning cover means is being closed.

5. A magnetic tape transducer system as claimed in claim 1, wherein said insertion means comprises a cassette positioning cover means for closing the insertion channel means and for inserting the cassette into its final position; said coupling means comprising first spring means coupled with said head carrier means for effecting shifting movement of the magnetic head as the cover means is opened, said first spring means being coupled with an inside of the cassette positioning cover means; and second spring means for effecting shifting of the magnetic head carrier means between the idle position with said magnetic head clear of said scanning location and an active position where the magnetic head is held at said scanning location in response to opening and closing of said cassette positioning cover means.

6. A magnetic tape transducer system as claimed in claim 5 wherein the first spring means is comprised of a tension spring which is placed under tension to retract the head from the scanning location when the cassette positioning cover means is opened.

7. A magnetic tape transducer system as claimed in claim 5 wherein said second spring means comprises a compression spring disposed concentrically to a pivot axis of the magnetic head carrier means and which exerts a torsional force on the magnetic head carrier means urging the head toward said scanning location.

8. A magnetic tape transducer system according to claim 7 including a drive motor means coupled with the magnetic head carrier means for effecting displacement of the magnetic head longitudinally along the pivot axis against the action of said compression spring.

9. A magnetic tape transducer system as claimed in claim 1 wherein said insertion means comprises a cassette retaining cover means for movement to a closed position to position and retain the cassette in said insertion channel means in its final position, and for movement to an open position to accommodate removal of the cassette from the insertion channel means; and a leaf spring means at the back of the insertion channel means, said leaf spring means pushing the cassette to a position protruding from the insertion channel means when the retaining cover means is shifted to its open position.

10. A magnetic tape transducer system as claimed in claim 1, wherein said insertion means comprises a cassette positioning cover means for closing said insertion channel means to position a cassette therein and reference pin means representing reference points for a plane of reference of the magnetic tape at the back end of the insertion channel means and at an inside of the cassette positioning cover means for effecting a final positioning of said cassette when the cover means is completely closed.

11. A magnteic tape transducer system as claimed in claim 1. wherein said insertion means comprises a cassette positioning cover and means which is movable to close the insertion channel means as the cassette is being inserted therein, a wedge being provided at the positioning cover means, a leaf spring being provided with steel balls and positioned to be engageable by said wedge as the positioning cover means is closed for pressing against the cassette from beneath the cassette with increased pressure after the positioning cover means is closed, so that the steel balls engage in corresponding recesses of the cassette.

12. A magnetic transducer system according to claim 1 wherein said cassette has a lateral opening at said scanning location selectively receiving said dust cover and said magnetic head, said insertion means comprising cassette positioning means shiftable from an open position providing access to said insertion channel means to a closed position closing said insertion channel means, and said said means for pivoting the dust cover being engaged by said cassette positioning means to shift said dust cover to its open position during insertion of the cassette into said insertion channel thereby to prevent obstruction of such movement of the dust cover because of the position of the magnetic head.

13. A magnetic transducer system according to claim 1, wherein said transducer unit has a fixed upper wall providing said insertion channel means in the form of a horizontally extended tunnel with an open end, the cassette being inserted edgewise in a horizontal plane through the open end and partially into said tunnel, and said insertion means being manually shiftable to effect completion of the edgewise movement of the cassette into its final position in the tunnel.

14. A magnetic transducer system according to claim 13 wherein said means for pivoting shifts said dust cover to its open position before the completion of edgewise movement of the cassette into said tunnel, thereby to enable clearance of the dust cover from the magnetic head and its carrier means during such shifting of the dust cover to its open position so as to allow the magnetic head to pivot to its operating position behind the open dust cover.

15. A magnetic tape transducer system for use with a cassette containing a tape and having a drive opening and a tape scanning location protected by a pivotable dust cover at a front end, and first and second lateral ends substantially perpendicular to the front end, comprising:

an insertion channel means for receiving the cassette first lateral end first, the insertion channel means having a back end adjacent the inserted first lateral end when the cassette is fully inserted and a front side parallel to an insertion direction of the cassette; a drive means positioned at said front side of the insertion channel means for interaction with the cassette drive opening and a magnetic head assembly also positioned at said front side positioned to interact with the scanning location;

a manually activatable insertion means for inserting the cassette into the channel means;

means coupled to said insertion means for pivoting the pivotable cassette dust cover from a closed position to an open position as the cassette is inserted into the insertion channel means; and means coupled to the insertion means for simultaneously moving the magnetic head assembly as the dust cover is pivoted such that the magnetic head assembly is positioned directly at the scanning location.

16. A system according to claim 15 wherein the means for moving the magnetic head assembly pivots the magnetic head assembly into position behind the dust cover when the dust cover swings into the open position.

17. A system according to claim 15 wherein the means for pivoting the dust cover comprises a swivel arm having a free end positioned to press against a lever-like extension of the dust cover.

18. A magnetic tape transducer system for use with a cassette containing a tape having a drive opening and a tape scanning location protected by a pivotable dust cover at a front end, and first and second lateral ends substantially perpendicular to the front end, comprising:
an insertion channel means for receiving the cassette first lateral end first, the insertion channel means having a back end adjacent the inserted first lateral end when the cassette is fully inserted and a front side parallel to an insertion direction of the cassette, a drive means being positioned at said front side of the insertion channel means for interaction with the cassette drive opening, and a magnetic head assembly also positioned at said front side positioned to interact with the scanning location;
a manually activatable insertion means for inserting the cassette into the channel means;
means for pivoting the pivotable cassette dust cover between a closed position and an open position as the cassette is being inserted into the insertion channel means;
means coupled to the insertion means for simultaneously moving the magnetic head assembly as the dust cover is being pivoted from its closed to open positions such that the magnetic head assembly is pivoted from an idle position to an operating position as the insertion means is inserting the cassette into the insertion channel means; and
said means for moving the magnetic head assembly being pivotable about an axis which is perpendicular to a running direction of the tape so that the head assembly can swing from the idle position to the operating position.

19. A system according to claim 18 wherein said insertion means comprises a cover, said means for pivoting comprising a swivel arm, means being provided for deflecting the swivel arm so as to engage a lever portion of the dust cover on the cassette as the cover is being closed, and said means for moving the magnetic head assembly including spring means connected to the cover such that as the cover closes off the insertion channel means, the magnetic head pivots toward the operating position as the swivel arm engages the cassette dust cover and opens it.

20. A magnetic tape transducer system for use with a cassette containing a tape having a drive opening and a tape scanning location protected by a pivotable dust cover at a front end, and first and second lateral ends substantially perpendicular to the front end, comprising:
an insertion channel means for receiving the cassette first lateral end first, the insertion channel means having a back end adjacent the inserted first lateral end when the cassette is fully inserted and a front side parallel to an insertion direction of the cassette, a drive means being positioned at said front side of the insertion channel means for interaction with the cassette drive opening, and a magnetic head assembly also positioned at said front side positioned to interact with the scanning location;
a manually activatable insertion means for inserting the cassette into the channel means;
means directly driven by the insertion means for pivoting the pivotable cassette dust cover being a closed position and an open position simultaneously as the cassette is being inserted into the channel means by the insertion means;
means coupled to the insertion means for simultaneously moving the magnetic head assembly as the dust cover is being pivoted from its closed to open positions such that the magnetic head assembly is pivoted from an idle position to an operating position as the insertion means is inserting the cassette into the channel means; and
said means for moving the magnetic head assembly being pivotable about an axis which is perpendicular to a running direction of the tape so that the head assembly can swing from the idle position to the operating position.

* * * * *